United States Patent [19]

Dolfsma et al.

[11] Patent Number: 4,820,061
[45] Date of Patent: Apr. 11, 1989

[54] ROLLING BEARING ASSEMBLY

[75] Inventors: Hendrik Dolfsma, Tull En'T Waal; Jacobus Zwarts, Nieuwegein, both of Netherlands

[73] Assignee: SKF Industrial Trading and Development Company, Nieuwegein, Netherlands

[21] Appl. No.: 189,987

[22] Filed: May 4, 1988

[30] Foreign Application Priority Data

May 7, 1987 [NL] Netherlands ............... 8701080

[51] Int. Cl.$^4$ .............. F16C 33/66; F01M 9/00; F16N 7/02
[52] U.S. Cl. ..................... 384/462; 184/65; 184/109; 384/473; 384/474
[58] Field of Search ............... 384/462, 466, 473, 474, 384/624, 322, 386, 397, 399, 400, 401; 184/65, 109, 106

[56] References Cited

U.S. PATENT DOCUMENTS 2,841,244  7/1958  Sorem ................. 384/466 X
3,019,065  1/1962  Neeley ................... 384/473
3,847,248  11/1974 Avery ..................... 184/109

FOREIGN PATENT DOCUMENTS 0014155  2/1977  Japan ..................... 384/474

Primary Examiner—Thomas R. Hannon
Attorney, Agent, or Firm—Eugene E. Renz, Jr.

[57] ABSTRACT

A rolling bearing assembly for mounting a shaft or similar member which has a housing encircling the shaft with at least one rolling bearing installed between two securing rings. The assembly consists of an outer and an inner race and at least one row of rolling elements. It has annular chambers in the housing on either side of the bearing, closed off on their outer edges by annular seals which are attached to the housing and in contact with the bearing shaft. It has at least one hole opening into one of the annular chambers throught the wall of the housing, capable of being placed in communication on the outside with a feeding device for introducing a lubricant into the housing. There are two channels (17, 17') extending through the wall of the housing (1) and located diametrically opposed to each other, each opening into the closed annular chamber (8), and in that a trough-like receptacle (18) is accommodated in said channels, in which an excess of lubricant can be collected.

7 Claims, 2 Drawing Sheets

ROLLING BEARING ASSEMBLY

FIELD OF THE INVENTION

This invention broadly relates to a rolling bearing assembly for mounting a shaft or similar member.

BACKGROUND OF THE INVENTION

The invention broadly relates to a rolling bearing assembly for mounting a shaft or similar member, comprising a housing encircling the shaft with at least one rolling bearing installed therein between two securing rings, consisting of an outer and an inner race and at least one row of rolling elements therebetween. The housing has annular chambers on either side of said bearing closed off on their outer edges by annular sealing means attached to the housing and in contact with the bearing shaft. At least one opening is provided in one of the annular chambers extending through the wall of the housing, and in communication on the outside with a feeding device for introducing a lubricant into the housing.

In such a rolling bearing assembly, when the shaft mounted therein rotates, a lubricant in the form of a grease is continuously fed into the housing, for example by means of a device as disclosed in European Pat. No. 30,911, so that the annular chambers and the spaces inside the bearing are filled with the lubricant.

It has been found that such a bearing assembly will run hot in the course of time, as a result of an excess of lubricant inside the bearing. Then the shaft must be stopped and the housing disassembled so that the grease in the annular chambers may be removed, after which the housing must be reassembled, all of which are time-consuming operations during which the equipment to which the shaft pertains cannot operate.

SUMMARY OF THE INVENTION

The object of this invention is to provide a rolling bearing assembly of the above type that shall be free from this disadvantage.

This object is accomplished in that the bearing assembly according to the invention comprises two channels extending through the wall of the housing and located diametrally opposed to each other, each opening into the closed annular chamber. A trough-like receptacle is accommodated in the channels, in which an excess of lubricant can be collected.

Preferably the trough-like receptacle comprises a bottom sheet encircling the shaft perpendicular to the centerline and two mutually parallel erect walls directed inward along the lengthwise edges of the sheet. The sheet and walls extend at least as far as the channels. Means connected with the walls and sheet close off the channels from the surroundings, the receptacle being composed of two halves each capable of being pushed into and out of a channel, and in retracted condition at their inner edges so abutting or in contact with each other as to form the receptacle. Each half is provided with the closing-off means which in retracted condition close off the channels. The bottom part of each half, at the inner edge, is bounded by a transverse rim in which a recess is arranged that, in retracted condition of the halves, encircles the shaft together with the recess in the transverse rim of the other half.

In a bearing assembly constructed in this way, at stated times, for example at the time when an empty feeding device is replaced with a full one, the receptacle with the grease in it may be removed from the housing and replaced with a clean receptacle, without need to stop the shaft. Then the pulled receptacle, filled with grease, can be cleaned.

Preferably the lock ring on the side at the annular chamber into which the mouth opens is almost in contact at its inner periphery with the shaft, and is provided with an opening in which is held one end of a supply pipe, the other end of which is in communication with the mouth. Preferably, an annular seal is arranged between the inner end of the lock ring and the shaft. By this arrangement, no lubricant can penetrate into the annular chamber in question, which chamber moreover has dead spaces from which the lubricant cannot escape.

Advantageously, the closing-off means comprise prolongations, extending outside the housing through a channel, of the bottom and the erect lengthwise walls, an erect transverse wall located outside the housing and connected to the bottom and the lengthwise walls, and a coverplate extending essentially parallel to the bottom and covering the transverse wall and the prolongations of the lengthwise walls, the inner edge of which plate adjoins the housing wall, whereby the capacity of the receptacle to collect grease is augumented.

In another embodiment, the closing-off means for a channel comprise a wall part projecting from the bottom extending between the lengthwise walls, and adapted to the shape of the housing.

BRIEF DESCRIPTION OF THE DRAWINGS

These and other objects of the present invention and the various features and details of the operation and construction thereof are hereinafter more fully set forth with reference to the accompanying drawings, wherein.

The invention will be further illustrated with reference to the drawing, in which.

DETAILED DESCRIPTION OF THE PREFERRED EMBODIMENT

Figure 1:
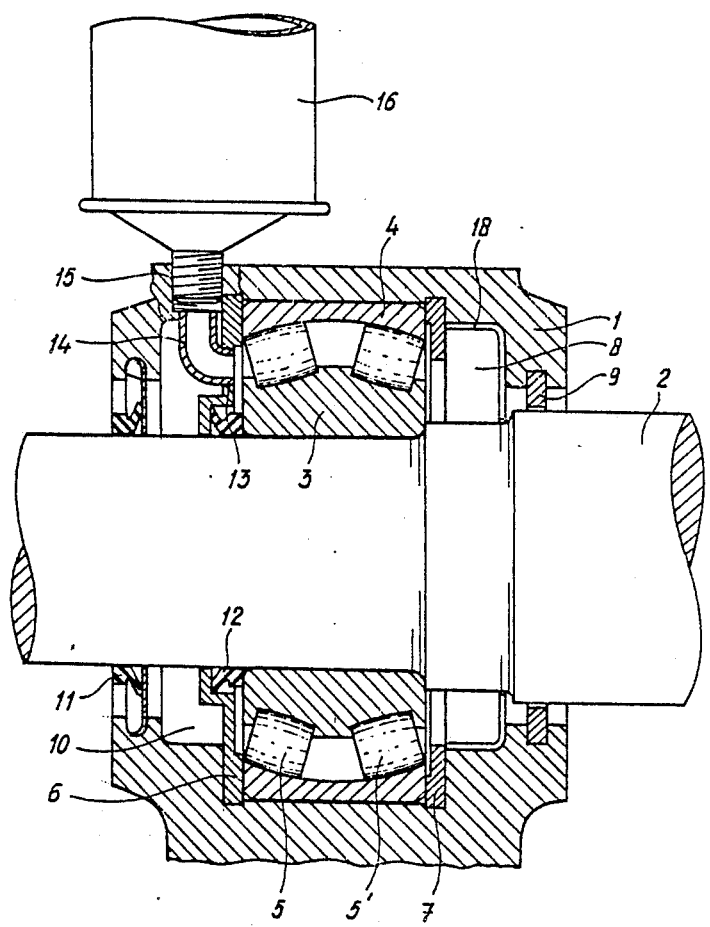
FIG. 1 in axial section, shows a rolling bearing assembly according to the invention, and FIG. 2, in perspective, shows the receptacle, thrust into the housing, which latter is indicated by broken lines.
Figure 2:
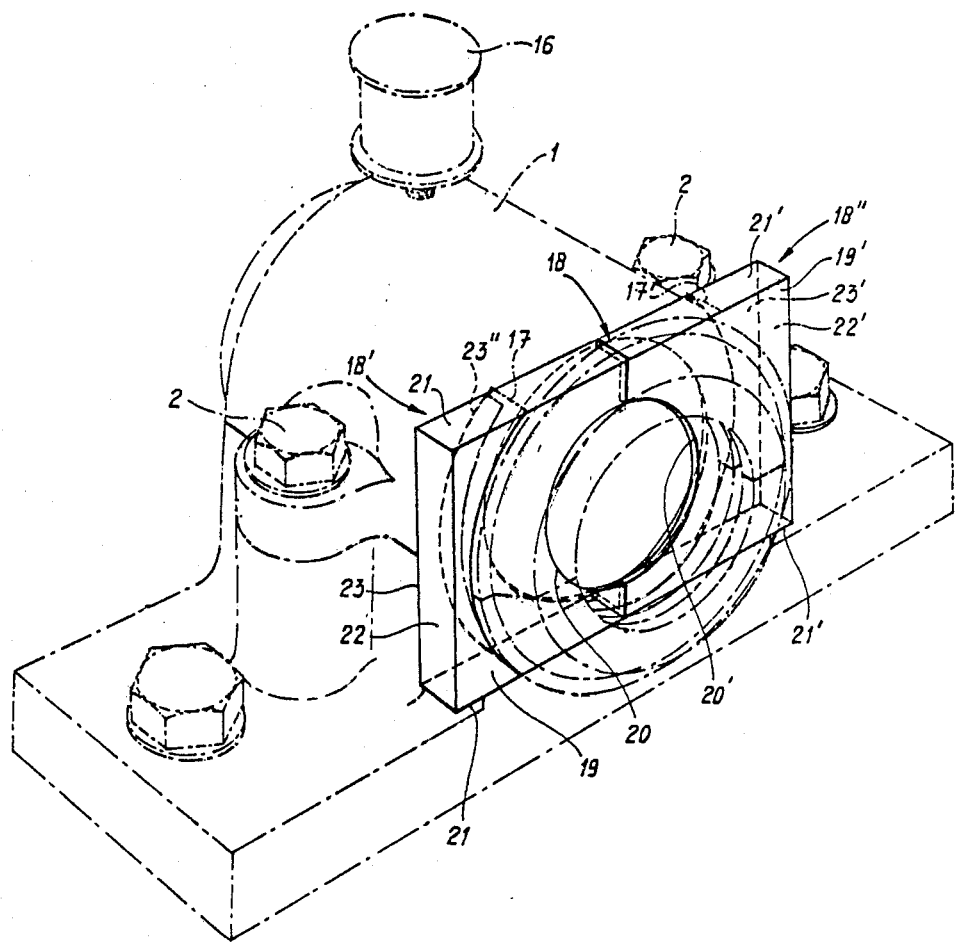

As shown in the figures, the rolling bearing assembly comprises a housing 1 consisting of two parts held together by means of bolts 2 (FIG. 2). Through the housing passes the shaft 2 (FIG. 1), mounted inside the housing on a rolling bearing consisting of an inner race 3, an outer race 4 and two rows of rolling elements, 5, 5' located between the races 3 and 4. The bearing 3, 4, 5 is secured in the housing by means of the locking rings 6 and 7. Next to the rolling bearing, on one side there is an annular chamber 8 closed off on the outside by a sealing ring 9 secured in the housing 1 and encircling the shaft 2 (FIG. 1). Next to the locking ring 6 there is an annular chamber 10 closed off on the outside by a sealing ring 11 attached to the housing and encircling the shaft 2 (FIG. 1).

The inner periphery of the locking ring 6 encircles the shaft 2, while a sealing ring 12 is present so that the chamber 10 is closed off from the bearing 3, 4 except for an opening 13 in the locking ring 6, in which is held one end of a pipe fitting 14. The other end of pipe fitting 14 is in communication with an opening 15 through the wall of the housing 1. Into the opening 15 is screwed the mouth of a grease proportioning means 16 by means of which lubricant is fed continuously into the housing 1. Lubricant passes directly through pipe 14 into the bearing 3, 4 and hence is unable to pass into the annular chamber 10. The lubricant is thereby optimally utilized.

Through the wall of the housing 1 pass two channels 17 and 17' diametrally opposed to each other, opening into the annular chamber 8. In these channels is accomodated a receptacle 18 consisting of two halves 18' and 18'', which halves can be thrust into and out of channels 17 and 17' respectively, said halves 18', 18'' in the retracted position as shown in FIG. 2 being in contact with each other so that together they form the receptacle 18. To this end, each half 18', 18'' has a bottom 19, 19' the free edge of which is provided with a recess 20, 20' in the form of a seim-circle and two mutually parallel erect lengthwise walls 21, 21' connected to the bottoms 19, 19'. Further, each half 18', 18'' is provided with an erect transverse wall 22, 22' interconnecting the lengthwise walls 21, 21' and a coverplate 23' covering the transverse walls 22, 22' completely and the lengthwise walls 21, 21' partially, whereof the free edge 23'', 23''' has a shape adapted to the peripheral shape of the housing 1, so that in the retracted condition of the halves 18', 18'' in FIG. 2 the channels 17, 17' are closed off from the surroundings by the coverplate 23, 23', the transverse walls 22, 22' and the portions projecting outside of housing 1 of the lengthwise walls 21, 21' and the bottom 19, 19'. In this retracted condition of the halves 18', 18'', the lengthwise walls 21 and 21' together form continuous lengthwise walls and the bottoms 19 and 19' together form a continuous bottom encircling the shaft 2 (FIG. 1) by their recesses 20, 20'.

Now when, after some time in operation, the empty or nearly empty proportioning means 16 is to be replaced by a full one, the receptacle halves 18', 18'' can be pulled from the housing 1, and the quantity of lubricant accumulated therein from the annular chamber 8 can be removed, whereafter clean receptacle halves 18' and 18'' are replaced in the housing 1. Likewise in the meantime, in particular if the receptacle is made of a transparent material, the receptacle can be emptied when full.

What is claimed is:

1. Rolling bearing assembly for mounting a shaft or similar member, comprising a housing encircling the shaft with at least one rolling bearing installed therein between two securing rings, consisting of an outer and an inner race and at least one row of rolling elements therebetween, there being first and second annular chambers in the housing on either side of said bearing, closed off on their outer edges by annular sealing means attached to the housing, and a hole opening into said first annular chamber being made through the wall of the housing, capable of being placed in communication on the outside with a feeding device for introducing a lubricant into the housing, characterized in that there are two channels (17, 17') extending through the wall of the housing (1) and located diametrally opposed to each other, each opening into the second annular chamber (8), and in that a trough-like receptacle (18) is accommodated in said channels, in which an excess of lubricant can be collected.

2. Rolling bearing assembly according the claim 1, characterized in that the collecting receptacle (18) comprises a bottom sheet (19, 19') encircling the shaft (2) and perpendicular to the centerline thereof, and two erect lengthwise walls (21, 21') parallel to each other and extending at least as far as the channel, and means connected to the outsides of said lengthwise walls and bottom for closing off the channels from the environment, said receptacle being composed of two halves (18', 18'') each capable of being pushed into and out of a channel (17, 17'), and in retracted condition, making contact with each other in such manner as to form the said receptacle (18), each half being provided with the said closing-off means closing off the channels (17, 17') when in retracted condition, and the bottom part (19, 19') of each half (18', 18'') being bounded on the inside by a transverse rim in which a recess (20, 20') is provided, which recess in retracted condition of the halves, together with the recess in the transverse rim of the other half, encircles the shaft (2).

3. Rolling bearing assembly according to claim 2, characterized in that the closing-off means comprise prolongations of the bottom (19, 19') and the erect lengthwise walls (21, 21') extending through a channel (17, 17') to the outside of the housing (1), an erect transverse wall (22, 22') located outside the housing (1) and connected to the bottom and the lengthwise walls, and a coverplate (23, 23') covering said transverse walls and the prolongations of the lengthwise walls and extending essentially parallel to the bottom (19, 19'), the inside of which plate adjoins the wall of the housing (1).

4. Rolling bearing assembly according to claim 2, characterized in that the closing-off means for a channel (17, 17') comprise a wall part projecting from the bottom (19, 19'), extending between the lengthwise walls (21, 21'), and adapted to the shape of the housing (1).

5. Rolling bearing assembly according to any one of claims 1 to 4, characterized in that a securing ring (6) at the first annular chamber (8) into which the hole opening (15) opens, is nearly in engagement at its inner periphery with the shaft (2) and is provided with an opening (13), in which opening is held one end of a supply pipe (14) the other end of which communicates with the said hole opening (15).

6. Rolling bearing assembly according to claim 5, characterized in that an annular seal (12) is arranged between the inner end of the securing ring (6) and the shaft (2).

7. Rolling bearing assembly according to claims 6, characterized in that the collecting receptacle (18) is made of a transparent material.

* * * * *